US012645413B2

(12) United States Patent
    Ishihara

(10) Patent No.: US 12,645,413 B2
(45) Date of Patent: Jun. 2, 2026

(54) ELECTRONIC DEVICE AND MANAGEMENT SYSTEM

(71) Applicant: JUKI CORPORATION, Tokyo (JP)

(72) Inventor: Kazuyuki Ishihara, Tokyo (JP)

(73) Assignee: JUKI CORPORATION, Tokyo (JP)

( * ) Notice: Subject to any disclaimer, the term of this patent is extended or adjusted under 35 U.S.C. 154(b) by 30 days.

(21) Appl. No.: 18/522,113

(22) Filed: Nov. 28, 2023

(65) Prior Publication Data

US 2024/0176568 A1    May 30, 2024

(30) Foreign Application Priority Data

Nov. 29, 2022    (JP) ................................. 2022-190730

(51) Int. Cl.
    *G06F 3/14*        (2006.01)
    *D05B 19/00*       (2006.01)
    *D05B 19/04*       (2006.01)

(52) U.S. Cl.
    CPC ............. *G06F 3/14* (2013.01); *D05B 19/006* (2013.01); *D05B 19/04* (2013.01); *D05D 2205/16* (2013.01)

(58) Field of Classification Search
    CPC ......... G06F 3/14; D05B 19/006; D05B 19/04; D05D 2205/16
    See application file for complete search history.

(56) References Cited

U.S. PATENT DOCUMENTS 9,491,581 B1 * 11/2016 Dame ..................... H04L 67/52
10,001,791 B2 * 6/2018 Lagerstedt ......... G05D 23/1917
(Continued)

FOREIGN PATENT DOCUMENTS

EP        3517675 A1 *  7/2019  ............. D05B 25/00
JP    2006351041 A  * 12/2006
JP    2009039393 A  *  2/2009

OTHER PUBLICATIONS

European Patent Application No. 23212506.2; Extended European Search Report dated Jan. 30, 2024, 10 pages.

*Primary Examiner* — Redhwan K Mawari
(74) *Attorney, Agent, or Firm* — BAKERHOSTETLER

(57)                    ABSTRACT

The present disclosure assists in searching for a specific apparatus among a plurality of apparatuses installed in an installation area. The electronic device includes: a storage portion, installation information for indicating a relationship between position information and a communication apparatus, where the position information is position information of a plurality of installation apparatuses installed in an installation area, and the communication apparatus is associated with the installation apparatus; a communication portion configured to receive an advertising signal transmitted by the communication apparatus installed in the installation area; an estimation portion configured to estimate a relative position between a device body and the installation apparatus associated with the communication apparatus based on identification information of the communication apparatus and the installation information included in a received advertising signal; and a display control portion configured to display causes relative position information on a display portion, and the relative position information is capable of identifying the estimated relative position between the device body and the installation apparatus.

7 Claims, 6 Drawing Sheets

(56) References Cited

U.S. PATENT DOCUMENTS

| | | | | |
|---|---|---|---|---|
| 11,224,003 | B2 * | 1/2022 | Abe | H04W 8/005 |
| 12,198,548 | B1 * | 1/2025 | Kennedy | H04W 4/024 |
| 12,315,628 | B2 * | 5/2025 | Pierson | G16H 40/20 |
| 2010/0290359 | A1 * | 11/2010 | Dewey | G05B 19/4185 |
| | | | | 370/252 |
| 2011/0238375 | A1 | 9/2011 | Fujisaki | |
| 2012/0265913 | A1 * | 10/2012 | Suumaki | H04W 76/14 |
| | | | | 710/303 |
| 2014/0277607 | A1 | 9/2014 | Nixon et al. | |
| 2016/0278121 | A1 * | 9/2016 | Agiwal | H04W 8/005 |
| 2017/0085694 | A1 * | 3/2017 | Shibao | H04N 1/32765 |
| 2018/0152589 | A1 * | 5/2018 | Matsuda | H04N 1/32053 |
| 2019/0233995 | A1 * | 8/2019 | Atsumi | D05B 19/08 |
| 2020/0015030 | A1 * | 1/2020 | Hashisho | G01S 5/04 |
| 2020/0383036 | A1 * | 12/2020 | Abe | H04W 4/80 |
| 2021/0116262 | A1 | 4/2021 | Gupta et al. | |

* cited by examiner

ELECTRONIC DEVICE AND MANAGEMENT SYSTEM

FIELD

The present disclosure relates to an electronic device and a management system.

BACKGROUND

A plurality of sewing machines are installed in a sewing plant or the like. For example, Japanese Patent Application Publication No. 2021-153947 discloses a technology for obtaining operation information regardless of the type of sewing machine.

SUMMARY

Problem to be Solved

In a traditional sewing plant, when a maintenance worker or the like searches for a specific sewing machine among a plurality of sewing machines, it takes a lot of time to view a layout of the plant and a real sewing machine. Therefore, in a traditional plant facility where a plurality of apparatuses are provided, there is room for improvement in technologies for assisting the operators and the like in searching for a specific apparatus among the plurality of apparatuses.

An object of the present disclosure is to assist in searching for a specific apparatus from a plurality of apparatuses installed in an installation area.

Technical Solution

The present disclosure provides an electronic device, including: a storage portion, where the storage portion stores installation information for indicating a relationship between position information and a communication apparatus, the position information is position information of a plurality of installation apparatuses installed in an installation area, and the communication apparatus is associated with the installation apparatus; a communication portion, where the communication portion receives an advertising signal transmitted by the communication apparatus installed in the installation area, an estimation portion, where the estimation portion estimates a relative position between a device body and the installation apparatus associated with the communication apparatus based on identification information of the communication apparatus and the installation information included in a received advertising signal; and a display control portion, where the display control portion displays relative position information on a display portion, and the relative position information is capable of identifying the estimated relative position between the device body and the installation apparatus.

Beneficial Effects

According to the present disclosure, the searching for the specific apparatus from the plurality of apparatuses installed in the installation area is assisted.

REFERENCE SIGNS

10: management system;
30: sewing machine;
100: management apparatus;
110: display portion;
120: operation portion;
130: communication portion;
140: storage portion;
141: program;
150: control portion;
200: communication apparatus;
201: advertising signal;
210: communication portion;
220: storage portion;
221: program;
230: control portion;
300: electronic device;
310: control portion;
311: estimation portion;
312 display control portion;
320: storage portion;
321: program;
330: display portion;
340: operation portion;
350: communication portion;
500: installation information;
600: map information;
700: relative position information;
800: sewing machine information.

DETAILED DESCRIPTION OF THE EMBODIMENTS

Hereinafter, embodiments according to the present disclosure will be described based on the drawings, and the present disclosure is not limited to the embodiments.

[General Structure of a Management System]

Figures 1, 2:
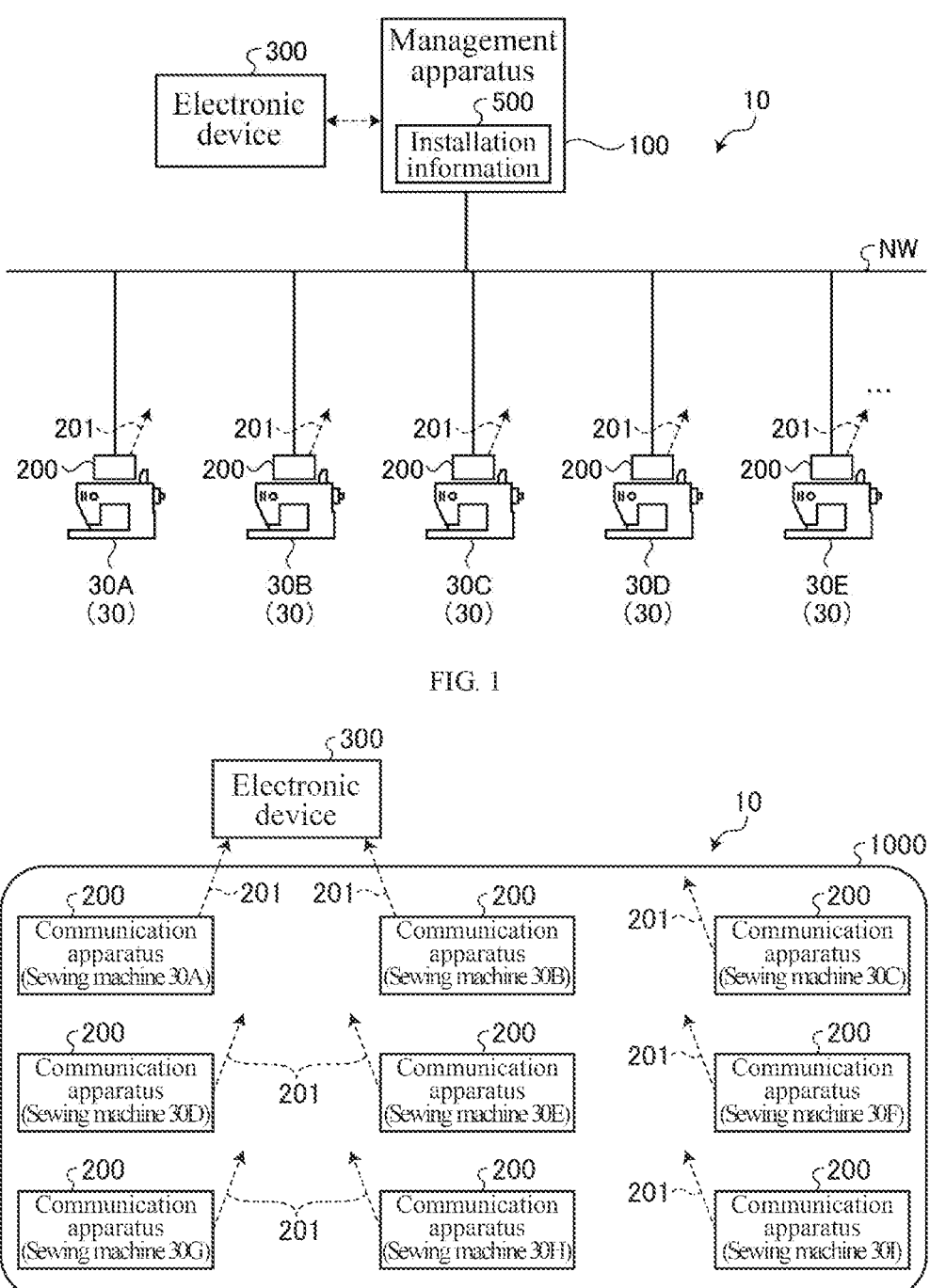
FIG. 1 is a structural diagram of a management system according to an embodiment.
FIG. 2 is a diagram showing an example of a map of an installation area when applying the management system shown in FIG. 1.
Figure 3:
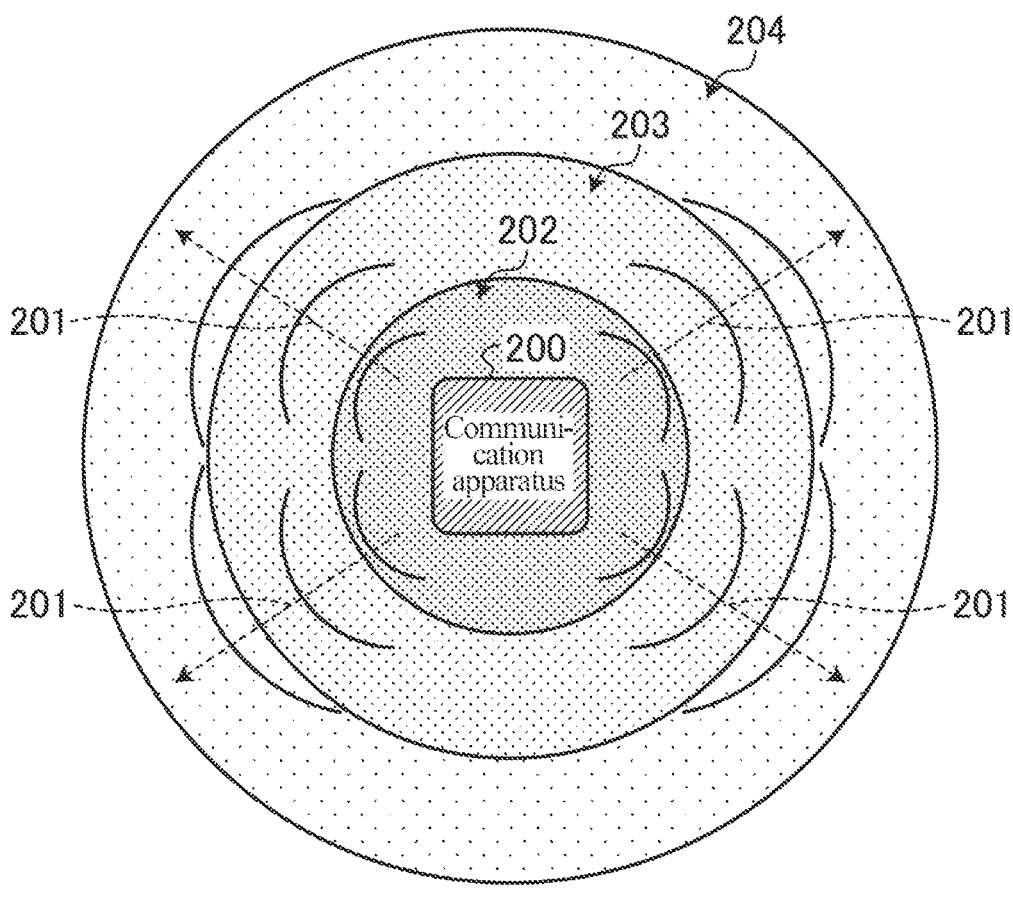
FIG. 3 is a diagram illustrating an advertising signal of the communication apparatus shown in FIG. 1.
Figure 4:
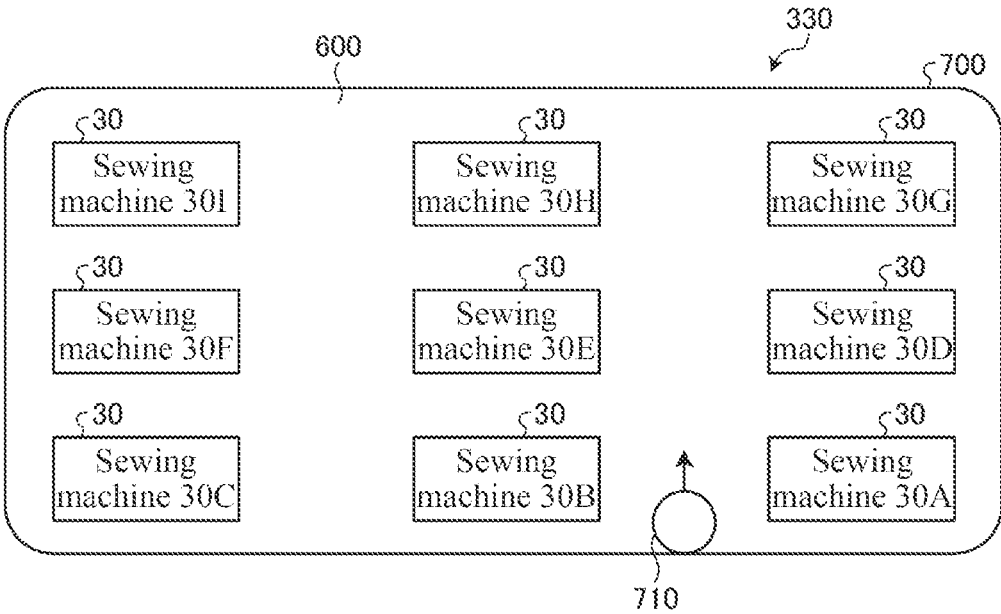
FIG. 4 is a diagram showing an example of relative position information of an electronic device.

FIG. 1 is a structural diagram of a management system according to an embodiment. FIG. 2 is a diagram showing an example of a map of an installation area when applying the management system shown in FIG. 1. FIG. 3 is a diagram illustrating an advertising signal of the communication apparatus shown in FIG. 1. FIG. 4 is a diagram showing an example of relative position information of an electronic device.

As shown in FIG. 1, the management system 10 is, for example, a sewing management system managing a plurality of sewing machines 30 installed in a sewing plant. The management system 10 includes: a management apparatus 100 managing the plurality of sewing machines 30; a plurality of communication apparatuses 200; and an electronic device 300. Each of the plurality of communication apparatuses 200 is associated with each of the plurality of sewing machines 30. In the following description, the electronic device 300 may be referred to as "device body".

In the present embodiment, each of the plurality of communication apparatuses 200 is provided near outsides of the sewing machines 30 associated in one-to-one correspondence. In addition, each of the plurality of communication apparatuses 200 may be installed inside the sewing machine 30.

In the management system 10, the management apparatus 100 and the plurality of communication apparatuses 200 are communicatively connected via network NW. The management apparatus 100 and the electronic device 300 are configured to transmit and receive various information through wired communication or wireless communication.

The management apparatus 100 includes, for example, a personal computer (PC), a tablet PC, a smart device, or the like. A smart device includes, for example, a smartphone, a smart watch, smart glasses, etc. In an example shown in FIG. 2, the management apparatus 100 has a function of managing a sewing machine 30A, a sewing machine 30B, a sewing machine 30C, a sewing machine 30D, a sewing machine 30E, a sewing machine 30F, a sewing machine 30G, a sewing machine 30H and a sewing machine I, which are installed in an installation area 1000 of a sewing plant or the like. In addition, the sewing machine 30A, the sewing machine 30B, the sewing machine 30C, the sewing machine 30D, the sewing machine 30E, the sewing machine 30F, the sewing machine 30G, the sewing machine 30H and the sewing machine I are described as "sewing machines 30" when no distinction is made, and repeated descriptions are omitted.

The management apparatus 100 has a function of managing installation information 500. The installation information 500 indicates a relationship between position information of an installation apparatus installed in the installation area 1000 (that is, the plurality of sewing machines 30) and identification information of the communication apparatus 200 associated with the sewing machine 30. As shown in FIG. 2, the installation information 500 includes information associating the position information of the sewing machine 30 with identification information of the communication apparatus 200. The position information of the sewing machine 30 includes, for example, information indicating a position of the sewing machine 30 in the installation area 1000. The management apparatus 100 has a function of managing map information of the installation area 1000 in which a plurality of sewing machines 30 are installed. The map information includes information indicating a map of the installation area 1000 and positions and layouts of the plurality of sewing machines 30 in the installation area 1000. The map information includes, for example, information indicating icons, graphics and the like of the plurality of sewing machines 30 shown on the map of the installation area 1000. The management apparatus 100 has a function of providing the installation information 500 and the map information to the electronic device 300 and the like. The management apparatus 100 has a function of providing instruction information to the electronic device 300. The instruction information instructs an operator or the like to respond to and maintain the sewing machine 30 in which an abnormality has occurred.

The communication apparatus 200 may be installed inside the sewing machine 30 or near the outside of the sewing machine 30 as long as the communication apparatus 200 can be considered to be located at the same position as the sewing machine 30 in the installation area 1000. The vicinity of the outside of the sewing machine 30 includes, for example, a frame body of the sewing machine 30, a workbench, a ceiling, a pillar, and a wall of the installation area 1000, etc.

The communication apparatus 200 is an apparatus capable of performing broadcast communication and transmitting data to an unspecified plurality of communication apparatuses. As shown in FIG. 3, the communication apparatus 200 radially transmits a Bluetooth (registered trademark) advertising signal 201. The advertising signal 201 is a wireless signal communicating a presence of the communication apparatus 200. A receiving side can estimate a distance to the communication apparatus 200 based on a received signal strength (where a received signal strength indicator can be abbreviated as RSSI) of a radio wave of the received advertising signal 201. In an example shown in FIG. 3, a received signal strength of the communication apparatus 200 weakens as the distance increases, as shown by a first strength 202, a second strength 203 and a third strength 204. The receiving side can determine the distance to the communication apparatus 200 by estimating which of the first strength 202, the second strength 203, and the third strength 204 the received signal strength is. In addition, in FIG. 3, in order to simplify the description, only four advertising signals 201 are shown, and signals in other directions are omitted.

Each of the plurality of communication apparatuses 200 transmits the advertising signal 201 including the identification information, attribute information and the like of the communication apparatus 200 in a set transmission cycle. The identification information of the communication apparatus 200 includes, for example, an ID assigned to the communication apparatus 200. The identification information may include, for example, an ID of the sewing machine 30 associated with the communication apparatus 200. The plurality of communication apparatuses 200 may be installed in the installation area 1000 in close proximity to the communication apparatuses 200. Each of the plurality of communication apparatuses 200 may transmit the advertising signal 201 at different times, or may transmit the advertising signals 201 at the same time.

When each of the plurality of communication apparatuses 200 obtains sewing machine information indicating an abnormality, maintenance, etc. from the associated sewing machine 30, each of the plurality of communication apparatuses 200 transmits an advertising signal 201 including the sewing machine information. The advertising signal 201 is a signal including the identification information of the communication apparatus 200, the attribute information of the communication apparatus 200, and the sewing machine information. That is, when the associated sewing machine 30 is in a state such as abnormality or maintenance request, the communication apparatus 200 can transmit the advertising signal 201 including the sewing machine information indicating the state. The sewing machine information is an example of apparatus information.

The electronic device 300 shown in FIG. 1 and FIG. 2 is used by users such as operators and managers maintaining the sewing machine 30. The electronic device 300 is consisted of, for example, a smart device, a personal computer, a tablet, or the like. In this embodiment, the electronic device 300 being a smartphone carried by an operator or the like and capable of moving in the installation area 1000 is described. The electronic device 300 provides a function of assisting the movement of the user in the installation area 1000 when, for example, receiving the instruction information from the management apparatus 100 or receiving an instruction from the operator.

The electronic device 300 is configured to receive advertising signals 201 transmitted from the plurality of communication apparatuses 200. The electronic device 300 has a function of obtaining, from the management apparatus 100, various information such as installation information 500 of the plurality of communication apparatuses 200 in the installation area 1000 and map information of the installation area 1000. The electronic device 300 has a function of estimating a relative position between a device body and the sewing machine 30 associated with the communication apparatus 200 based on the identification information and the installation information 500 of the communication apparatus 200 of the communication apparatus 200 included in the received advertising signal 201. In the present embodiment, the relative position indicates a position relationship between the device body and one or more sewing machines 30 in the installation area 1000 when a current position of the device body is taken as a reference position. The position relationship includes, for example, relationships such as direction and distance from the reference position to an object position. In addition, the relative position may also indicate a position relationship between the sewing machine 30 and the current position of the device body when a position of the sewing machine 30 is taken as a reference. The electronic device 300 has a function of displaying relative position information on a display portion. The relative position information can identify the estimated relative position between the device body and the sewing machine 30.

In FIG. 2, it is assumed that the operator carrying the electronic device 300 is going to maintain the sewing machine 30D in the installation area 1000, and is approaching the sewing machine 30A and the sewing machine 30B. Furthermore, it is assumed that each of the plurality of communication apparatuses 200 transmits the advertising signal 201 in a transmission cycle.

The electronic device 300 receives the advertising signal 201 transmitted by the communication apparatus 200 of the sewing machine 30A and the advertising signal 201 transmitted by the communication apparatus 200 of the sewing machine 30B, without receiving other advertising signals 201. The electronic device 300 identifies the advertising signal 201 comes from the communication apparatus 200 of the sewing machine 30A or the sewing machine 30B based on identification information of the advertising signal 201. The electronic device 300 estimates the current position of the device body in the installation area 1000 based on a received signal strength of the received advertising signal 201, an arrival direction of the radio wave and the installation information 500, and further estimates a relative distance between the device body and the communication apparatus 200 (that is, the sewing machine 30). The electronic device 300 generates the relative position information based on an estimation result, and the relative position information can identify the estimated relative positions between the sewing machine 30A, the sewing machine 30B and the device body. The relative position information includes, for example, information indicating position relationships between the device body, the sewing machine 30A and the sewing machine 30B when a position of the device body is taken as a reference.

As shown in FIG. 4, the electronic device 30) displays relative position information 700 on the display portion 330. The relative position information 700 indicates the estimated relative positions between the sewing machine 30A, the sewing machine 30B and the device body on the map information 600. The map information 600 is information obtained from the management apparatus 100, and is information indicating a map that can identify a layout from the sewing machine 30A to the sewing machine 30I in the installation area 1000. The map information 600 is configured in a manner taking a moving direction of the electronic device 300 as an upper direction. The relative position information 70) is information that configures device body information 710 indicating the device body on the map information 600, and indicates the estimated relative positions between the sewing machine 30A, the sewing machine 30B and the device body. The device body information 710 includes information indicating the current location of the electronic device 300 and a traveling direction of the electronic device 300. For example, when the device body is in a relative position closer to the sewing machine 30B than the sewing machine 30A, the relative position information 700 is information that the device body information 710 is configured on the map information 600 in a manner that the device body is in the relative position closer to the sewing machine 30B than the sewing machine 30A.

In addition, the relative position information 700 may be information indicating only an estimated relative position between the device body and the sewing machine 30A and an estimated relative position between the device body and the sewing machine 30B, but not indicating the sewing machine 30C to the sewing machine 30I that have not received the advertising signal 201. Thereby, the electronic device 300 allows the user to identify the communication apparatus 200 (the sewing machine 30) receiving the advertising signal 201 through the relative position information 700.

In the management system 10, when the electronic device 300 receives the advertising signal 201 from the communication apparatus 200, the relative position between the device body and the sewing machine 30 associated with the communication apparatus 200 is estimated based on the identification information and the installation information 500 of the communication apparatus 200 included in the advertising signal 201. The electronic device 300 displays the relative position information 70) on the display portion 330. The relative position information 70) can identify the estimated relative position between the device body and the sewing machine 30. The electronic device 300 can show the user the relative position information 700 displayed on the display portion 330 of the electronic device 300, so that the user can grasp the current position in the installation area 1000. As a result, the electronic device 300 can identify the relative position between the device body and the sewing machine 30 based on the displayed relative position information 700, and therefore can assist in searching for a specific sewing machine 30 from the plurality of sewing machines 30 installed in the installation area 1000. In addition, since the electronic device 300 uses the advertising signal 201 of the communication apparatus 200, the searching for the to-be-searched sewing machine 30 is assisted just by receiving the signal from the communication apparatus 200.

Since the management system 10 associates the communication apparatus 200 with the sewing machine 30 (installation apparatus), even if the layout of the installation area 1000 is changed, the sewing machine 30 is replaced, etc., it can be easily handled by simply associating the communication apparatus 200 with the sewing machine 30, and convenience can be improved.

In addition, the electronic device 300 displays the relative position information 700 on the display portion 330, and the relative position information 700 indicates the relative position between the device body and the sewing machine 30 on the map information 600 indicating the installation area 1000. The electronic device 300 can identify the position relationship between the current position of the device body in the installation area 1000 and a moving target sewing machine 30 (installation apparatus) based on the displayed relative position information 700, and the searching for the to-be-searched sewing machine 30 is efficiently assisted.

In addition, when the advertising signal 201 received from the communication apparatus 200 includes the sewing machine information, the electronic device 300 displays the sewing machine information on the display portion 330. The electronic device 300 displays the sewing machine information of the sewing machine 30 that is close to the device body, and the process based on the sewing machine information is assisted.

[Management Apparatus]

Figure 5:
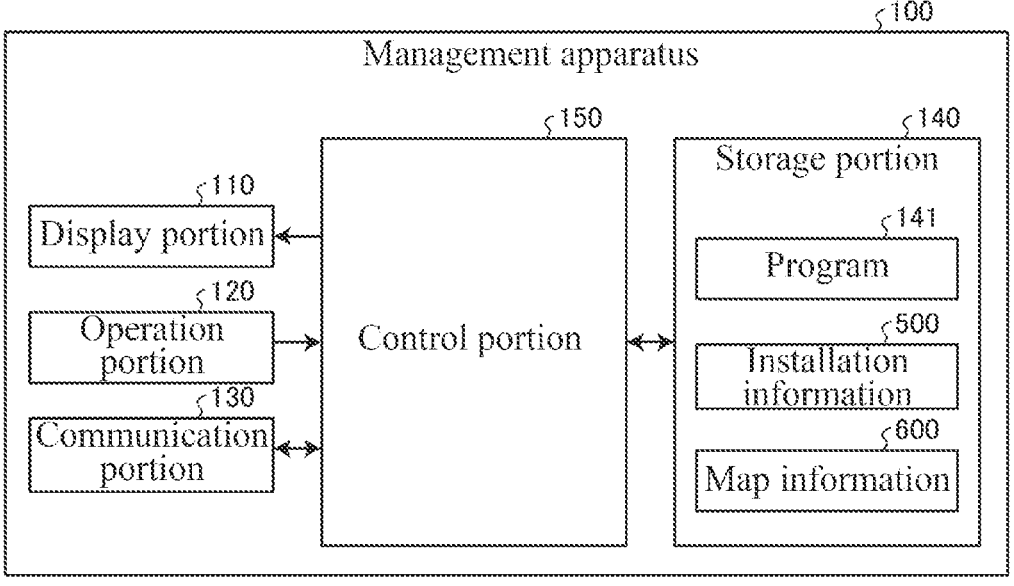
FIG. 5 is a diagram showing an example of a functional structure of a management apparatus.

FIG. 5 is a diagram showing an example of a functional structure of a management apparatus 100. As shown in FIG. 5, the management apparatus 100 includes a display portion 110; an operation portion 120; a communication portion 130; a storage portion 140; and a control portion 150. The control portion 150 is electrically connected to the display portion 110, the operation portion 120, the communication portion 130, the storage portion 140, and the like.

The display portion 110 is configured to display various information under the control of the control portion 150. The display portion 110 includes a display panel such as a liquid crystal display or an organic electro-luminescence (EL) display. The display portion 110 displays various information based on a signal input from the control portion 150.

The operation portion 120 includes one or more devices for receiving user operations. Devices for receiving user operations include, for example, a key, a button, a touch screen, a mouse, and the like. The operation portion 120 can provide information corresponding to a received operation to the control portion 150.

The communication portion 130 can communicate with, for example, the communication apparatus 200 of the sewing machine 30, the electronic device 300, other communication devices, and the like. The communication portion 130 can support various communication standards. The communication portion 130 transmits and receives various information via, for example, a wired or wireless network NW. The communication portion 130 can provide received information to the control portion 150. The communication portion 130 transmits the information to a transmission destination instructed by the control portion 150.

The storage portion 140 can store a program and data. The storage portion 140 may also be used as a work area for temporarily storing processing results of the control portion 150. The storage portion 140 can store various information, such as a program 141, the above-mentioned installation information 500, and the map information 600. The program 141 causes the control portion 150 to execute a function of managing a plurality of sewing machines 30, a function of providing various information to the electronic device 300, and the like. The installation information 500 includes: information indicating a relationship between the position information of the installation apparatus installed in the installation area 1000 (that is, the sewing machine 30) and the communication apparatus 200 associated with the sewing machine 30. The installation information 500 may include identification information and type information of the sewing machine 30, the communication apparatus 200, and the like. The map information 600 includes map information indicating the layout, the position, and the like of the sewing machine 30 in the installation area 1000.

The control portion 150 is an arithmetic processing device. The control portion 150 can execute a command included in the program 141 stored in the storage portion 140 while referring to the information stored in the storage portion 140 when necessary. Furthermore, the control portion 150 controls the structure of the sewing machine 30 based on the data and the command, thereby realizing various functions.

The control portion 150 can provide a function of transmitting the installation information 500, the map information 600 and the like to the electronic device 300 by executing the program 141. By executing the program 141, the control portion 150 can provide a function of arranging a response for the sewing machine 30 when an error, a maintenance request, or the like is notified from the sewing machine 30. The control portion 150 can provide a function of transmitting and receiving various information via the communication portion 130.

The functional configuration example of the management apparatus 100 provided by this embodiment has been described above. In addition, the above-mentioned structure described using FIG. 5 is only an example, and the functional structure of the management apparatus 100 of this embodiment is not limited to this example. The functional structure of the management apparatus 100 of this embodiment can be flexibly modified based on specifications and operations.

[Structure Example of Communication Apparatus]

Figure 6:
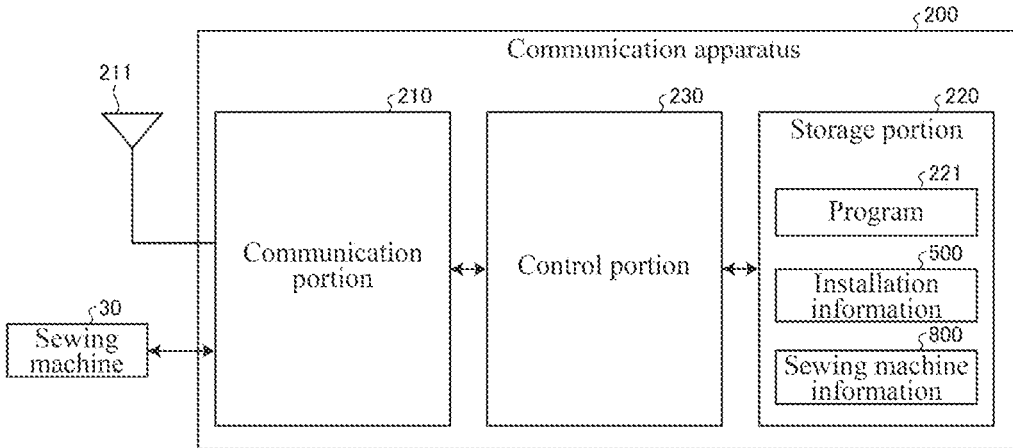
FIG. 6 is a diagram showing an example of a structure of a communication apparatus.

FIG. 6 is a diagram showing an example of a structure of a communication apparatus 200. As shown in FIG. 6, the communication apparatus 200 includes a communication portion 210, a storage portion 220 and a control portion 230. The control portion 230 is electrically connected to the communication portion 210 and the storage portion 220.

The communication portion 210 includes an antenna 211. Under the control of the control portion 230, the communication portion 210 radiates a radio wave including the advertising signal 201 from the antenna 211 to surroundings of the device body, thereby transmitting the advertising signal 201. The communication portion 210 is configured to be communicable with the sewing machine 30. The communication portion 210 is configured to be communicable with the sewing machine 30 via a wired or wireless network or the like. The communication portion 210 provides information such as sewing machine information 800 received from the sewing machine 30 to the control portion 230. The communication portion 210 transmits the information instructed by the control portion 230 to the sewing machine 30.

The storage portion 220 can store various information such as a program 221, installation information 500 and sewing machine information 800. The program 221 is a program that causes the control portion 230 to execute a function for realizing processing related to various operations of the communication apparatus 200. The installation information 500 is information obtained from a management apparatus 100. The installation information 500 includes identification information, attribute information, and the like of the communication apparatus 200. The installation information 500 includes information indicating the relationship between the position information of the installation apparatus installed in the installation area 1000 (that is, the sewing machine 30) and the communication apparatus 200 associated with the sewing machine 30. The sewing machine information 800 includes information indicating the sewing machine 30 associated with the communication apparatus 200 is in the state such as abnormality or maintenance request.

The control portion 230 is a computer responsible for controlling the communication apparatus 200. The control portion 230 implements various functions by executing the program 121. The control portion 230 controls the communication portion 210 so that the advertising signal 201 including the identification information, the attribute information, etc. of the communication apparatus 200 is transmitted at a set transmission cycle. When the control portion 230 receives (obtains) the sewing machine information 800 indicating an abnormality, maintenance, etc. from the sewing machine 30 associated with the communication apparatus 200, the control portion 230 controls the communication portion 210 to transmit the advertising signal 201 including the sewing machine information 800.

The functional configuration example of the communication apparatus 200 provided by this embodiment has been described above. In addition, the above-mentioned structure explained using FIG. 6 is only an example, and the functional structure of the communication apparatus 200 of this embodiment is not limited to this example. The functional structure of the communication apparatus 200 of this embodiment can be flexibly modified based on specifications and operations.

[Electronic Device]

Figure 7:
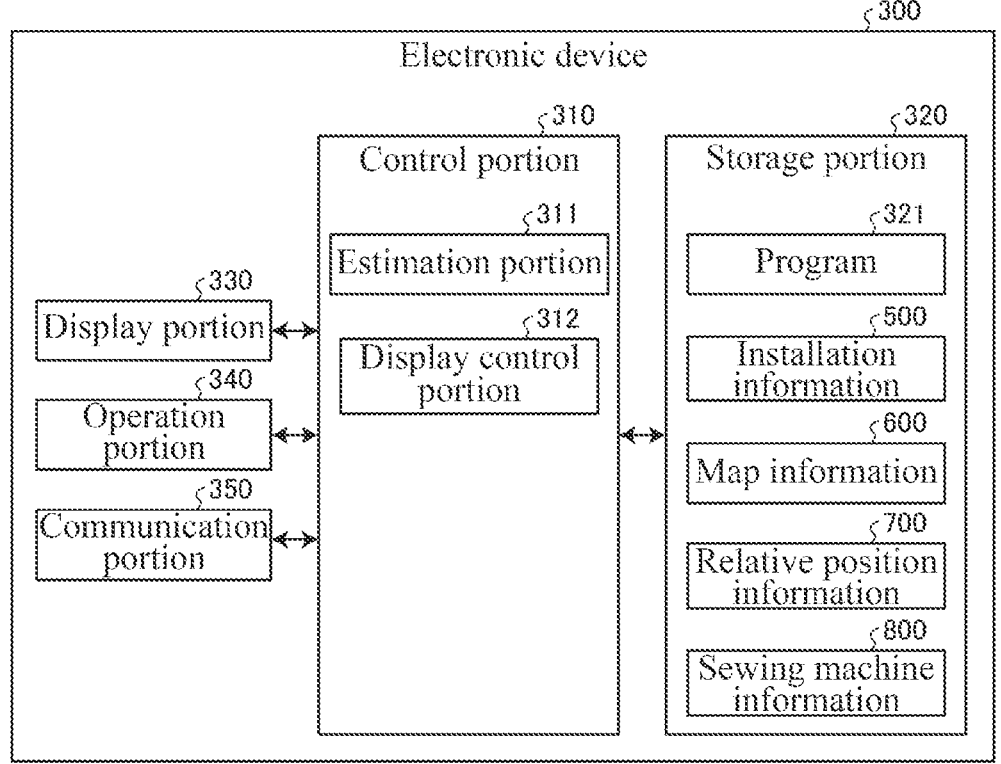
FIG. 7 is a diagram showing an example of a structure of an electronic device.

FIG. 7 is a diagram showing an example of a structure of an electronic device 300. As shown in FIG. 7, the electronic device 300 includes: a control portion 310 controlling the electronic device 300; a storage portion 320 connected to the control portion 310; a display portion 330: an operation portion 340; and a communication portion 350. The control portion 310 is consisted of a central processing device, such as a CPU. The storage portion 320 stores a program executed by the control portion 310 and functions as a work area of the control portion 310.

The storage portion 320 can store various information such as a program 321, installation information 500, map information 600, relative position information 700 and sewing machine information 800. The program 321 is a program that causes the control portion 310 to execute a function for realizing processing related to various operations of the electronic device 300. The installation information 500 and the map information 600 are the above-mentioned installation information 500 and the above-mentioned map information 600 obtained from the management apparatus 100. The relative position information 700 includes information indicating the relative position between the sewing machine 30 and the device body estimated by the electronic device 300 on the map information 600. The sewing machine information 800 is included in the advertising signal 201 received by the communication portion 350.

The display portion 330 is configured to display various information under the control of the control portion 310. The display portion 330 includes a display panel such as a liquid crystal display or an organic EL display. The display portion 330 displays various information such as the relative position information 700 based on a signal input from the control portion 310.

The operation portion 340 includes one or more devices for receiving user operations. Devices for receiving user operations include, for example, a key, a button, a touch screen, a mouse, and the like. The operation portion 340 can provide information corresponding to a received operation to the control portion 310.

The communication portion 350 can communicate with, for example, the management apparatus 100, the communication apparatus 200 of the sewing machine 30, other communication apparatuses, and the like. The communication portion 350 can support various communication standards. The communication portion 350 transmits and receives various information via, for example, a wired or wireless network NW. The communication portion 350 can provide received information to the control portion 310. The communication portion 350 transmits the information to a transmission destination instructed by the control portion 310.

The communication portion 350 is configured to receive a radio wave including the advertising signal 201 transmitted by the communication apparatus 200. The communication portion 350 extracts the advertising signal 201 from the received radio wave via an antenna element (not shown) and estimates a received signal strength of the received radio wave. The communication portion 350 provides information indicating the estimated received signal strength to the control portion 310. The communication portion 350 extracts identification information, attribute information, apparatus information, and the like of the communication apparatus 200 included in the received advertising signal 201, and provides the extracted information to the control portion 310. The communication portion 350 estimates an arrival direction of the radio wave and a distance to the communication apparatus 200 by using a received signal strength (such as a receiving level and a sensitivity) of the radio wave including the received advertising signal 201, and provides the estimated arrival direction and the estimated distance as a direction and a distance of the sewing machine 30 to the control portion 310. When the communication portion 350 has received a plurality of radio waves, the communication portion 350 provides directions and distances of the plurality of sewing machines 30 to the control portion 310 based on received signal strengths of each of the plurality of radio waves.

The control portion 310 includes functional portions such as an estimation portion 311 and a display control portion 312. The control portion 310 executes the program 321 to implement the functional portions such as the estimation portion 311 and the display control portion 312. The program 321 is a program for causing the control portion 310 of the electronic device 300 to function as the estimation portion 311 and the display control portion 312. The control portion 310 implements or executes information processing functions and effects described below.

The estimation portion 311 estimates, via the communication portion 350, a relative position between the device body and the sewing machine 30 (installation apparatus) associated with the communication apparatus 200 based on the identification information of the communication apparatus 200 included in the received advertising signal 201 and the installation information 500 of the storage portion 320. The estimation portion 311 estimates a current position of the sewing machine 30 in the installation area 1000 based on the direction of the sewing machine 30 estimated by the communication portion 350, a receiving level of a radio wave from the communication apparatus 200, and the like. For example, when receiving only the advertising signal 201 from the communication apparatus 200 of the sewing machine 30A, the estimation portion 311 estimates that the device body is located near the sewing machine 30A in the installation area 1000. For example, when receiving only the advertising signal 201 from the communication apparatus 200 of the sewing machine 30B and the sewing machine 30C, the estimation portion 311 estimates that the device body is located between the sewing machine 30B and a vicinity of the sewing machine 30C in the installation area 1000. The estimation portion 311 generates the relative position information 700 indicating the estimated relative position, and stores the relative position information 700 in the storage portion 320.

The display control portion 312 causes the display portion 330 to display the relative position information 700, and the relative position information 700 is configured to identify the estimated relative position between the device body and the sewing machine 30 associated with the communication apparatus 200. The display control portion 312 causes the display portion 330 to display the relative position information 700, and the relative position information 700 indicates the relative position between the device body and the sewing machine 30 (installation apparatus) on the map information 600 indicating the installation area 1000. When the display control portion 312 has received the sewing machine information 800 of the sewing machine 30 from the communication apparatus 200, the display control portion 312 displays the received sewing machine information 800 on the display portion 330.

In the present embodiment, the case where the display control portion 312 displays the relative position information 700 on the display portion 330 of the device body has been described, but the present disclosure is not limited to this. For example, the display control portion 312 may cause the relative position information 700 to be output from a speaker, a headphone, or the like through sound. For example, the display control portion 312 may display the relative position information 700 on an external display apparatus or the like.

As above, the functional structure example of the electronic device 300 provided by this embodiment has been described. In addition, the above-mentioned structure explained using FIG. 7 is only an example, and the functional structure of the electronic device 300 of this embodiment is not limited to this example. The functional structure of the electronic device 300 of this embodiment can be flexibly modified based on specifications and operations.

[Processing Procedure of Electronic Device]

Figure 8:
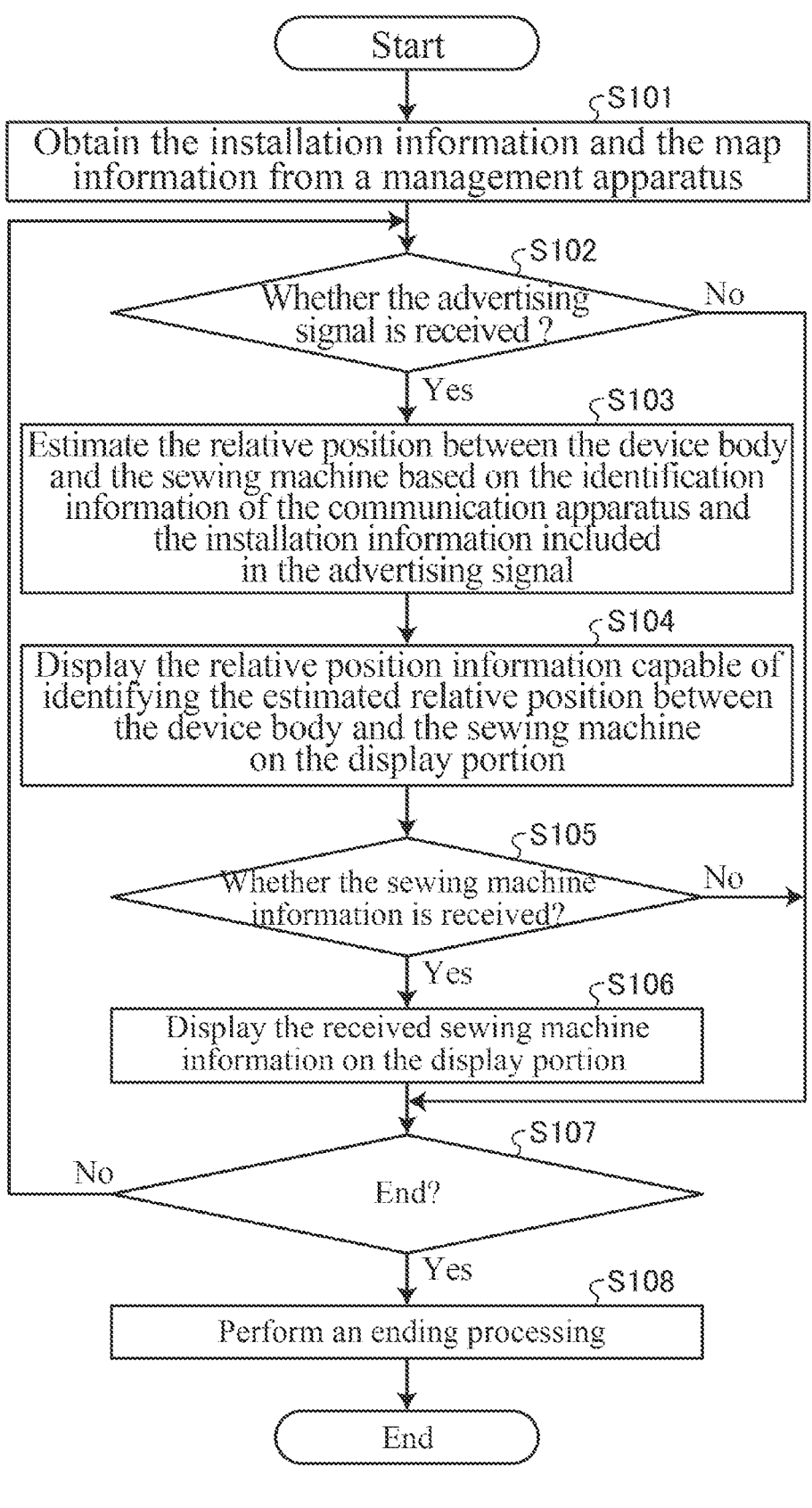
FIG. 8 is a flowchart showing an example of a processing procedure executed by an electronic device.

An example of a processing procedure of an electronic device 30) will be described in the following. FIG. 8 is a flowchart showing an example of a processing procedure performed by an electronic device 300. The processing procedure shown in FIG. 8 is implemented by a control portion 310 of the electronic device 3M through executing a program 321. The processing procedure shown in FIG. 8 is performed by the control portion 310 at a predetermined time. The predetermined time includes, for example, when the user is guided to a sewing machine 30 or when the electronic device 300 is started.

As shown in FIG. 8, the control portion 310 of the electronic device 300 obtains the installation information 500 and the map information 600 from a management apparatus 100 via the communication portion 350 (step S101). For example, the control portion 310 obtains, from the management apparatus 100, the installation information 500 and the map information 600 corresponding to the installation area 1000 that guide the user, and stores the obtained information in the storage portion 320. When step S101 ends, the control portion 310 proceeds to step S102.

The control portion 310 determines whether the advertising signal 201 is received (step S102). For example, when receives one or more advertising signals 201 from the communication portion 350, the control portion 310 determines that the advertising signal 201 has been received. When the control portion 310 determines that the advertising signal 201 has not been received (that is, "No" in step S102), the control portion 310 proceeds to step S105 described below. In addition, when the control portion 310 determines that the advertising signal 201 has been received (that is, "Yes" in step S102), the control portion 310 proceeds to step S103.

The control portion 310 estimates the relative position between the device body and the sewing machine 30 based on the identification information and the installation information 500 of the communication apparatus 200 included in the advertising signal 201 (step S103). For example, the control portion 310 estimates a current position of the sewing machine 30 in the installation area 1000 based on a direction of the sewing machine 30 estimated by the communication portion 350, a receiving level of a radio wave from the communication apparatus 200, and the like. For example, when the control portion 310 has received the advertising signal 201 from the communication apparatus 200, the relative position information 700 between the device body and the sewing machine 30 associated with the communication apparatus 200 in the installation area 1000 is estimated. For example, when the control portion 310 receives a plurality of advertising signals 201 from a plurality of communication apparatuses 200, in the installation area 1000, the relative position information 700 between the device body and the plurality of sewing machines 30 associated with each of the plurality of communication apparatuses 200 is estimated. When the control portion 310 stores the estimated relative position information 700 in the storage portion 320, the process proceeds to step S104.

The control portion 310 displays the relative position information 700 on the display portion 330, and the relative position information 700 is capable of identifying the estimated relative position between the device body and the sewing machine 30 (step S104). For example, the control portion 310 controls the display portion 330 to display the relative position information 700 on the map information 600. For example, when the control portion 310 has already displayed the relative position information 700 on the display portion 330, the display portion 330 is switched to display the relative position information 700 estimated this time. The display portion 330 can display the latest relative position information 700 on the map information 600, and the user can grasp nearby which sewing machine 30 in the installation area 1000 is himself located. When step S104 ends, the control portion 310 proceeds to step S105.

The control portion 310 determines whether the sewing machine information 800 is received (step S105). For example, when the advertising signal 201 received in step S102 includes the sewing machine information 800, the control portion 310 determines that the sewing machine information 800 has been received. When the control portion 310 determines that the sewing machine information 800 has not been received (that is, "No" in step S105), the control portion 310 proceeds to step S107 described below. In addition, when the control portion 310 determines that the sewing machine information 800 has been received (that is. "Yes" in step S105), the control portion 310 proceeds to step S106.

The control portion 310 displays the received sewing machine information 800 on the display portion 330 (step S106). For example, the control portion 310 controls the display portion 330 to display the sewing machine information 800 included in the advertising signal 201. For example, the control portion 310 controls the display portion 330, to display the relative position information 700 displayed by the display portion 330 in step S104 in association with the sewing machine information 800. The display portion 330 can allow the user to identify information such as an abnormality and maintenance request indicated by the sewing machine information 800 through displaying the sewing machine information 800 transmitted from the sewing machine 30 to the user. When step S106 ends, the control portion 310 proceeds to step S107.

The control portion 310 determines whether to end the process (step S107). For example, the control portion 310 determines to end the process shown in FIG. 8 when the control portion 310 receives an ending instruction from the user via the operation portion 340 or when the control portion 310 receives an ending instruction from the management apparatus 100 via the communication portion 350. When the control portion 310 determines that the process is not to be ended (that is, "No" in step S107), the control portion 310 returns to the step S102 (which has already been described) and continues the process. In addition, when the control portion 310 determines that the process is ended (that is, "Yes" in step S107), the control portion 310 proceeds to step S108.

The control portion 310 performs an ending processing (step S108). The ending processing includes, for example, ending the displaying of the display portion 330 being displayed, deleting the installation information 500 and the map information 600 obtained from the management apparatus 100, and the like. When the end process is finished, the control portion 310 ends the process shown in FIG. 8.

[Example of Operations of Management System]

Figure 9:
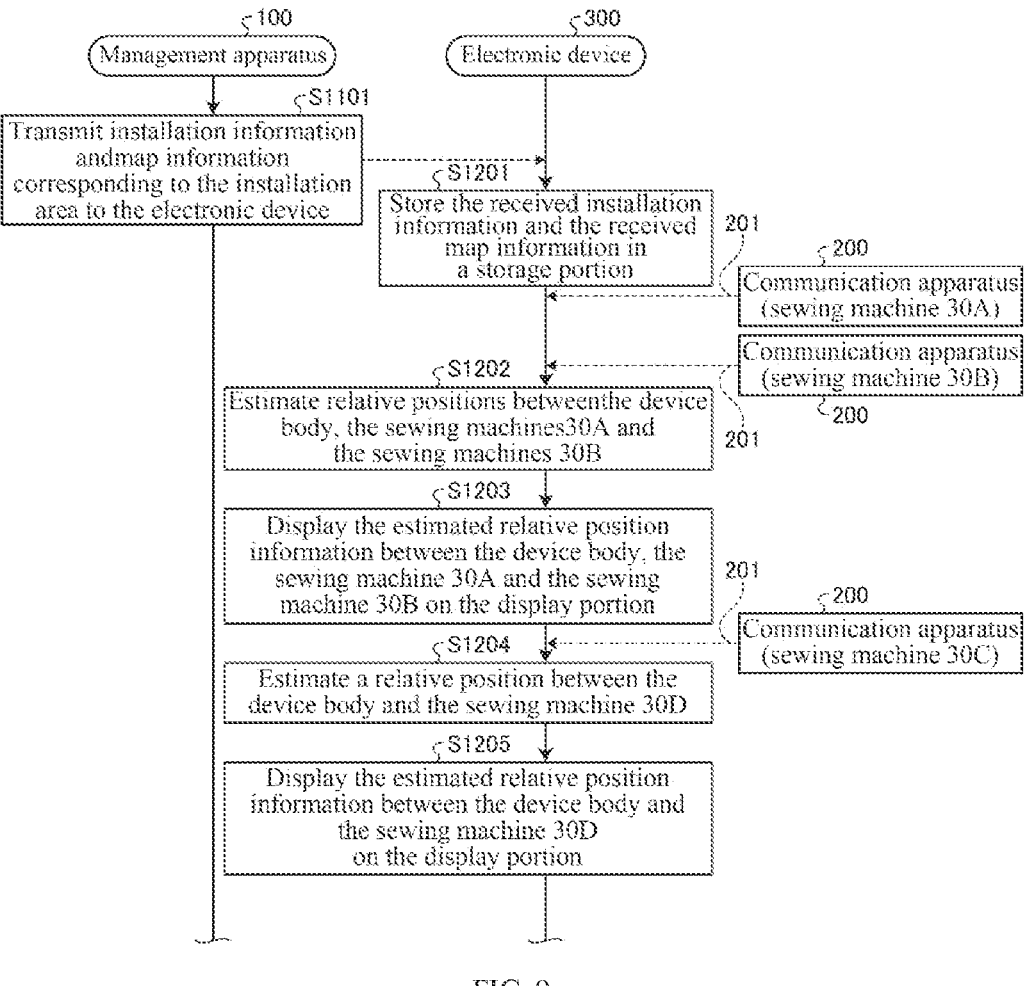
FIG. 9 is a diagram showing an example of operations of a management apparatus, a communication apparatus and an electronic device.

An example of operations of a management apparatus 100, a communication apparatus 200 and an electronic device 300 in a management system 10 will be described in the following. FIG. 9 is a diagram showing an example of operations of a management apparatus 100, a communication apparatus 200 and an electronic device 300. In the example shown in FIG. 9, it is assumed that a user carrying the electronic device 300 moves from a vicinity of a sewing machine 30A and a sewing machine 30B towards a sewing machine 30D in an installation area 1000 shown in FIG. 2.

As shown in FIG. 9, the management apparatus 100 transmits installation information 500 and map information 600 corresponding to the installation area 1000 to the electronic device 300 based on a request from the electronic device 300, an instruction from an administrator, or the like (step S1101).

The electronic device 300 stores the installation information 500 and the map information 600 received from the management apparatus 100 in a storage portion 320 (step S1201). Furthermore, as the user moves toward a passage between the sewing machine 30A and the sewing machine 30B, the electronic device 300 approaches the sewing machine 30A and the sewing machine 30B in the installation area 1000.

When the electronic device 300 receives advertising signals 201 from the communication apparatus 200 of the sewing machine 30A and the communication apparatus 200 of the sewing machine 30B respectively, relative positions between the device body, the sewing machines 30A and the sewing machines 30B are estimated based on the received advertising signals 201 (step S1202). Furthermore, the electronic device 300 displays the estimated relative position information 700 between the device body, the sewing machine 30A and the sewing machine 30B on the display portion 330 (step S1203). That is, as shown in FIG. 4, the electronic device 300 displays the relative position information 700 on the display portion 330. The relative position information 700 can identify the estimated relative positions between the sewing machine 30A, the sewing machine 30B and the device body on the map information 600. The user of the electronic device 300 can identify that himself is located near the sewing machine 30A and the sewing machine 30B in the installation area 1000.

Since the user moves towards the sewing machine 30D through the passage between the sewing machine 30A and the sewing machine 30B, the electronic device 300 moves away from the sewing machine 30A and the sewing machine 30B in the installation area 1000 and approaches the sewing machine 30D.

Returning to FIG. 9, when the electronic device 30) receives the advertising signal 201 from the communication apparatus 200 of the sewing machine 30D, a relative position between the device body and the sewing machine 30D is estimated based on the received advertising signal 201 (step S1204). Furthermore, the electronic device 300 displays the estimated relative position information 700 between the device body and the sewing machine 30D on the display portion 330 (step S1205). That is, the electronic device 300 displays the relative position information 700 on the display portion 330, and the relative position information 700 is capable of identifying the estimated relative position between the sewing machine 30D and the sewing machine 30D on the map information 600. The user of the electronic device 300 can identify that himself approaches the sewing machine 30D in the installation area 1000.

[Effect]

As described above, the electronic device 300 estimates the relative position between the device body and the sewing machine 30 associated with the communication apparatus 200 based on the advertising signal 201 transmitted by the communication apparatus 200. The electronic device 300 displays the relative position information 700 on the display portion 330. The relative position information 700 is capable of identifying the estimated relative position between the device body and the sewing machine 30. The electronic device 300 can show the user the relative position information 700 displayed on the display portion 330 of the electronic device 300, so that the user can grasp the current position in the installation area 1000. As a result, the electronic device 300 can identify the relative position between the device body and the sewing machine 30 based on the displayed relative position information 700, and therefore can assist in searching for a specific sewing machine 30 from the plurality of sewing machines 30 installed in the installation area 1000. In addition, since the electronic device 300 uses the advertising signal 201 of the communication apparatus 200, the searching for the to-be-searched sewing machine 30 in the installation area 1000 is assisted just by receiving the signal from the communication apparatus 200.

In addition, the electronic device 300 displays the relative position information 700 indicating the relative position between the device body and the sewing machine 30 (installation apparatus) on the map information 600 indicating the installation area 1000 on the display portion 330. The electronic device 300 can identify the position relationship between the current position of the device body in the installation area 1000 and a moving target sewing machine 30 (installation apparatus) based on the displayed relative position information 700, and the searching for the to-be-searched sewing machine 30 is efficiently assisted.

When the advertising signal 201 received from the communication apparatus 200 includes the sewing machine information 800 (apparatus information), the electronic device 300 displays the sewing machine information 800 on the display portion 330. The electronic device 300 displays the sewing machine information 800 of the sewing machine 30 that is close to the device body, and the process based on the sewing machine information 800 is assisted.

The installation apparatus of the electronic device 300 is the sewing machine 30. Accordingly, even if the electronic device 300 provides a plurality of sewing machines 30 in the installation area 1000, the user can easily identify positions of the sewing machines 30 using only the communication apparatus 200 associated with the sewing machines 30.

In the management system 10, the communication apparatus 200 transmits an advertising signal 201 including identification information of the installation apparatus, and the electronic device 300 estimates the relative position between the device body and the sewing machine 30 associated with the communication apparatus 200 based on the advertising signal 201. The management system 10 displays the relative position information 700 on the display portion 330. The relative position information 700 is capable of identifying the relative position between the device body and the sewing machine 30 estimated by the electronic device 300. The management system 10 can show the user the relative position information 700 displayed on the display portion 330 of the electronic device 300, so that the user can grasp the current position in the installation area 1000. As a result, the management system 10 can identify the relative position between the device body and the sewing machine 30 based on the displayed relative position information 700, and therefore can assist in searching for a specific sewing machine 30 from the plurality of sewing machines 30 installed in the installation area 1000. In addition, since the management system 10 uses the advertising signal 201 of the communication apparatus 200, the searching for the to-be-searched sewing machine 30 in the installation area 1000 is assisted just by receiving the signal from the communication apparatus 200 via the management system 10.

The management system 10 includes the management apparatus 100, and the management apparatus 100 is configured to be able to communicate with the electronic device 300 and transmit the installation information 500 to the electronic device 300. Accordingly, the management system 10 can assist the searching for different installation apparatuses in the installation area 1000, because the management apparatus 100 can transmit the installation information 500 of the installation area 1000 of the to-be-searched installation apparatus to the electronic device 300.

Other Embodiments

In the above-described embodiment, the management system 10 has been described in a case where the sewing machines 30 (that is, the installation apparatuses) and the communication apparatus 200 are in one-to-one correspondence, but the present disclosure is not limited to this. For example, the management system 10 may also associate a plurality of installation apparatuses with one communication apparatus 200. In this case, the electronic device 300 only needs to be configured to estimate approximate relative positions between the device body and the plurality of installation apparatuses, and display the relative position information 700 on the display portion 330.

In the above-described embodiment, referring to the electronic device 300, a case where the installation apparatus being the sewing machine 30 has been described, but the disclosure is not limited to this. The installation apparatuses may be, for example, a plurality of processing apparatuses, manufacturing apparatuses, measurement apparatuses, etc., which are installed in an installation area such as a plant or equipment.

What is claimed is:

1. An electronic device, comprising:

a storage portion, wherein the storage portion stores installation information for indicating a relationship between position information and a communication apparatus, the position information is position information of a plurality of installation apparatuses installed in an installation area, and the communication apparatus is associated with the installation apparatus;

a communication portion, wherein the communication portion receives an advertising signal transmitted by the communication apparatus installed in the installation area;

an estimation portion, wherein the estimation portion estimates a relative position between a device body and the installation apparatus associated with the communication apparatus based on identification information of the communication apparatus and the installation information comprised in a received advertising signal, generates relative position information based on estimated relative position, and stores the relative position information in the storage portion, the relative position information comprising information indicating position relationships between the device body and the installation apparatus when a position of the device body is taken as a reference; and a display control portion, wherein the display control portion displays the relative position information on a display portion, and the relative position information is configured to identify the estimated relative position between the device body and the installation apparatus.

2. The electronic device of claim 1, wherein, the display control portion displays the relative position information on the display portion, wherein the relative position information indicates the relative position between the device body and the installation apparatus on map information indicating the installation area.

3. The electronic device of claim 2, wherein the communication portion receives the advertising signal comprising apparatus information related to at least one of abnormality and maintenance of the installation apparatus; and the display control portion displays the apparatus information on the display portion.

4. The electronic device of claim 3, wherein the installation apparatus is a sewing machine.

5. A management system, comprising:

a communication apparatus, installed in an installation area, and associated with an installation apparatus installed in the installation area; and an electronic device, assisting movement to the installation apparatus, wherein the communication apparatus transmits an advertising signal comprising identification information of the installation apparatus; and the electronic device comprises:

a storage portion, wherein the storage portion stores installation information for indicating a relationship between position information and the communication apparatus, the position information is position information of the installation apparatus installed in the installation area, and the communication apparatus is associated with the installation apparatus;

a communication portion, wherein the communication portion receives the advertising signal transmitted by the communication apparatus installed in the installation area;

an estimation portion, wherein the estimation portion estimates a relative position between a device body and the installation apparatus associated with the communication apparatus based on the identification information of the communication apparatus and the installation information comprised in the received advertising signal, generates relative position information based on estimated relative position, and stores the relative position information in the storage portion, the relative position information comprising information indicating position relationships between the device body and the installation apparatus when a position of the device body is taken as a reference; and a display control portion, wherein the display control portion displays the relative position information on a display portion, and the relative position information is configured to identify the estimated relative position between the device body and the installation apparatus.

6. The management system of claim 5, further comprising:

a management apparatus, configured to be communicable with the electronic device, and transmit the installation information to the electronic device.

7. The management system of claim 6 wherein the installation apparatus is a sewing machine.

* * * * *